US000001173H

United States Statutory Invention Registration [19]

[11] Reg. Number: H1173

Davis et al.

[43] Published: Apr. 6, 1993

[54] PAGING DEVICE WITH ALTERNATING ALERT OUTPUTS

[75] Inventors: Walter L. Davis, Coral Springs; George Drapac; Stephen H. Woltz, both of Boca Raton, all of Fla.

[73] Assignee: Motorola, Inc., Schaumburg, Ill.

[21] Appl. No.: 772,640

[22] Filed: Oct. 8, 1991

Related U.S. Application Data

[63] Continuation of Ser. No. 306,171, Feb. 6, 1989, abandoned.

[51] Int. Cl.[5] ..... G08B 5/22

[52] U.S. Cl. ..... 340/825.44; 340/825.46; 340/311.1; 455/38

[58] Field of Search ..... 340/825.44, 825.46, 340/825.47, 825.48, 311.1, 635, 636; 455/31, 32, 38, 343

[56] References Cited

U.S. PATENT DOCUMENTS

| | | | |
|---|---|---|---|
| 4,392,135 | 7/1983 | Ohyagi | 340/825.44 |
| 4,755,816 | 7/1988 | DeLuca | 455/38 |
| 4,876,536 | 10/1989 | Matai et al. | 340/311.1 |
| 4,918,438 | 4/1990 | Yamasaki | 340/407 |
| 4,935,735 | 6/1990 | DeLuca et al. | 340/825.44 |
| 4,975,693 | 12/1990 | Davis et al. | 340/825.44 |

FOREIGN PATENT DOCUMENTS

| | | | |
|---|---|---|---|
| 0147046 | 11/1980 | Japan | 340/825.44 |
| 2090450 | 7/1982 | United Kingdom | 340/825.44 |
| 2146153 | 4/1985 | United Kingdom | 340/825.44 |

*Primary Examiner*—Bernarr E. Gregory
*Attorney, Agent, or Firm*—Gregg Edward Rasor; William E. Koch; Vincent B. Ingrassia

[57] ABSTRACT

In a selective call radio paging device, a plurality of alerts are generated in response to the decoding of a message having an address corresponding to the address assigned to the pager. A specific alert envelope waveform is generated and drives an alerting device of a first type (e.g., a transducer). Inverting means is provided to invert the envelope and cause a second alerting device (e.g., visual) to be activated in a manner complementary to the first. Thus, alerting devices are not operated concurrently, and peak loads on a resident power source are avoided.

14 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUNCTION 1

FUNCTION 2

FUNCTION 3

FUNCTION 4

PAGING DEVICE WITH ALTERNATING ALERT OUTPUTS

This is a continuation of application Ser. No. 306,171, filed Feb. 6, 1989, and now abandoned.

BACKGROUND OF THE INVENTION

This invention relates generally to selective call radio receivers, and more particularly, to a selective call radio paging receiver which combines multiple alerting devices which are operated alternatively rather than concurrently so as to improve battery performance.

Selective call radio receivers (commonly called "pagers") traditionally alert a user to an incoming message and may be categorized according to the types of alerts they generate. For example, tone only pagers simply emit a short audible alert tone to inform the user that he has received a message, but the pager does not actually convey the message to the user. After hearing the alert tone, the user typically calls a prearranged telephone number to receive the actual message. Tone and voice pagers include the necessary audio circuits and a small speaker to permit the user to hear a verbal message following the alert tone. Display pagers include a small alphanumeric character display by means of which a short message, such as a telephone number, may be displayed.

Recent market trends have resulted in the combining of several alerting devices in one pager which are then caused to operate concurrently. Such alerting devices include lamps, vibrators, automatic back-lighting for liquid crystal displays (LCD's), light emitting diodes (LED's), and alert tone generators with either escalating volume or traditional manual volume adjustment.

Obviously, each such alerting device consumes battery power. It follows that combining several alerting devices in one pager and operating the several devices concurrently can rapidly discharge the battery. In fact, it can be shown that the activation of two such alerting devices simultaneously will have a more deleterious impact on battery performance than if the multiple alerting devices were activated sequentially (i.e. only one alerting device on at a time) or in a complementary manner (i.e. one alerting device on while another is off and vice versa).

SUMMARY OF THE INVENTION

It is therefore an object of the present invention to provide an improved paging device wherein the load placed on the battery as a result of the generation of multiple alerts is reduced by activating the alerting devices alternatively (i.e. avoiding the concurrent generation of multiple alerts).

According to a broad aspect of the invention, there is provided an alert generating apparatus for use with a pager of a type which includes an address decoder for determining if an address in the received signal corresponds to an address assigned to and stored within the receiver. First means is coupled to the address decoder for generating a first alert signal in accordance with a first predetermined pattern. Second means are provided for generating a second alert signal in accordance with a second predetermined pattern which is complementary or at least subsequent to the first predetermined pattern. The first alert signal may be an audible signal while the second alert signal may be visual. By generating the alert signals in this fashion, peak battery loading is avoided.

The above, and other objects, features and advantages of the present invention will be more clearly understood from the following detailed description taken in conjunction with the accompanying drawings, in which:

DESCRIPTION OF THE PREFERRED EMBODIMENT

Figure 1:
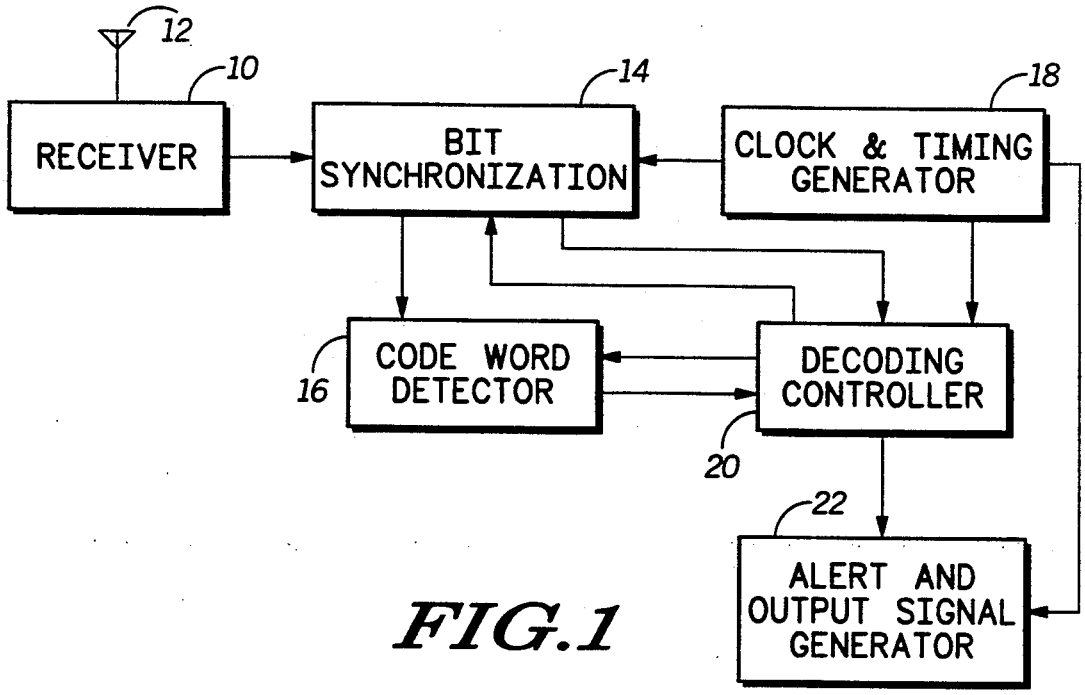
FIG. 1 is a block diagram of a paging receiver utilizing alert generating apparatus.
Figure 4A:
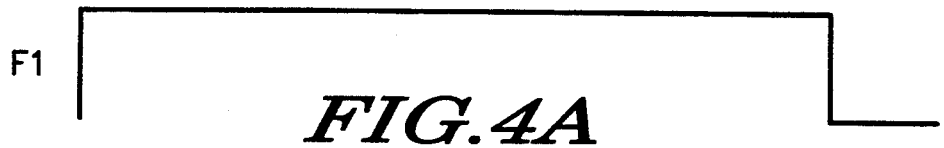
FIGS. 4A–D are waveforms illustrating four typical envelopes which may be generated by the alert envelope waveform generator shown in FIG. 2.
Figure 4B:
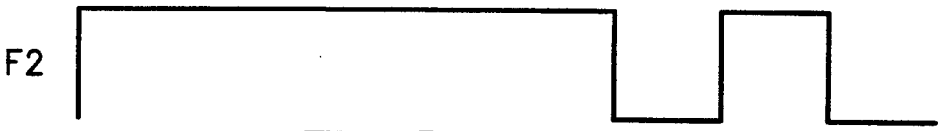
Figure 4C:
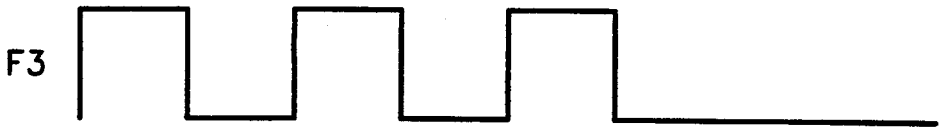
Figure 4D:
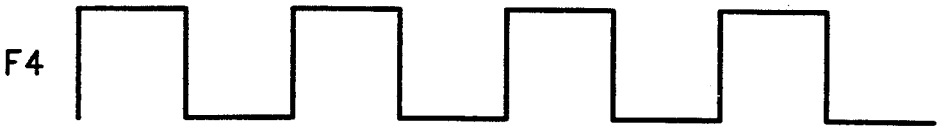

FIG. 1 is a functional block diagram of a selective call radio receiver (e.g., a pager) apparatus. The system comprises a receiver 10 equipped with antenna 12, a bit synchronization circuit 14, a code word detector 16, a clock and timing generator 18, a decoding controller 20, and an alert and output signal generator 22.

A modulated signal (e.g., in a standard POCSAG signal and code format as defined by the British Post Office Code Standardization Advisory Group) is received at receiver 10 by means of antenna 12. The output of receiver 10 is applied to a bit synchronization circuit 14 whose function it is to synchronize the bit decision circuit elements therein with the received signal bit stream.

When the apparatus is first turned on, it will attempt to achieve bit synchronization. If bit synchronization is established, bit synchronization circuit 14 will activate code word detector 16 which searches for a synchronization code word. That is, code word detector 16 compares the received bit stream with a synchronization code word sequence stored in memory.

Code word detector 16 functions as a bit-by-bit correlator, and if a received bit sequence differs from the synchronization code word sequence in less than a predetermined number of bit positions (e.g., three), the code word detector generates an indication to decoding controller 20 that a synchronization code word has been detected. Decoding controller 20 then switches the reference code word sequence to the address sequence of the pager, and code word detector 16 then searches for address code words. The error threshold may be reduced (e.g., lowered to two) when the code word detector 16 is searching for address code words. As will be described in more detail below, the code word detector 16 is capable of detecting as many as four different functions (F1, F2, F3, and F4) associated with one address word.

When an address function is detected by an address decoder in code word detector 16, one or more alert signals are generated by an alert output signal generator 22. As will be further described, a different alert pattern may be generated for each of the four functions associated with a single address. Furthermore, the alerts may be visual, audible, and/or tactile (vibratory).

Clock and timing generator 18 may include a crystal controlled clock oscillator and a timing chain driven by the oscillator. Generator 18 provides all the timing signals required for the operation of the bit synchronization circuit 14, code word detector 16, alert and output signal generator 22, and decoding controller 20. The timing signals into alert and output signal generator 22 determine the alert signal frequencies and durations.

Finally, decoding controller 20 controls the overall operation of bit synchronization circuit 14, code word detector 16, and alert and output signal generator 22 using timing signals from clock and timing generator 18. Decoding controller 20 may be comprised of specific circuits or may in fact consist of a host microcomputer such as an MC146805H2 made available by Motorola, Inc.

For a more detailed description of the structure and operation of a selective radio paging receiver of the type shown in FIG. 1, is made to U.S. Pat. No. 4,518,961 issued May 21, 1985 and entitled "Universal Paging Device with Power Conservation";

U.S. Pat. No. 4,649,538 issued Mar. 10, 1987 and entitled "Radio Paging Device with Improved Test Modes"; and U.S. Pat. No. 4,755,816 issued Jul. 5, 1988 and entitled "Battery Saving Method for a Selective Radio Paging Receiver", the teachings of which are hereby incorporated by reference.

As stated previously, when the address decoder within code word detector 16 decides that a decoded address within the received message corresponds to the address assigned to the selective call radio paging receiver, it is not uncommon to concurrently activate more than one alerting device, thus consuming a large amount of battery power; more than that which would be consumed had the alerting devices been activated sequentially.

Figure 2:
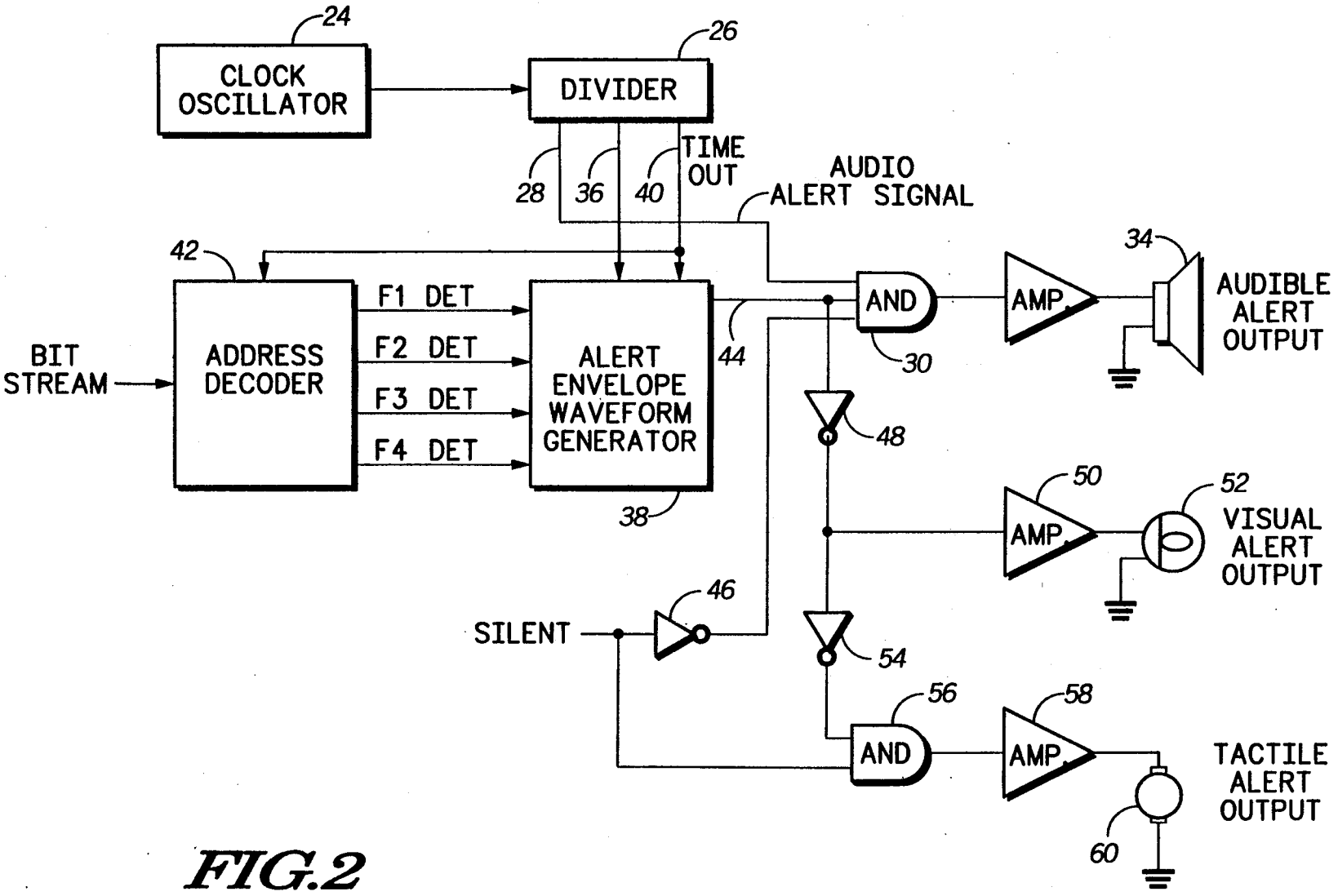
FIG. 2 is a block diagram of the inventive alert generating apparatus.

FIG. 2 is a block diagram of an alerting apparatus for use in a selective call radio paging receiver which causes the alerting devices to be activated not simultaneously, but sequentially in a complementary fashion. The output of a clock oscillator 24 having a frequency of, for example, 76.8 KHz, is applied to a divider chain 26. A first output 28 of divider 26 having a frequency of, for example, 2.4 KHz, is applied to a first input of AND gate 30. This is an audio alert signal which, after modulation in AND gate 30 and amplification in amplifier 32, will be applied to a speaker 34 for the purpose of generating an audible alert output.

Divider 26 generates a second output 36 which is applied to alert envelope waveform generator 38. This signal may have a frequency of, for example, 8 Hz. Finally, divider 26 generates a time-out signal at output 40 which is applied to both alert envelope waveform generator 38 and to address decoder 42. Time-out signal 40 functions to enable alert envelope waveform generator in a manner to be described below and also functions to reset the function detect outputs Fl DET, F2 DET, F3 DET, and F4 DET at the end of the time-out period (e.g., at the end of ten seconds).

Address decoder 42 monitors the input bit stream to determine if the address contained therein matches a stored address. If a match is detected, the first and second function bits in the POCSAG address code word are monitored to determine which function detect output (FI DET, F2 DET, F3 DET, F4 DET) to generate. Functions F1–F4 may be utilized to distinguish categories of callers on the basis of priority or some other criteria, or may be utilized to convey different types of messages.

In response to receiving a function detect signal from address decoder 24, alert envelope waveform generator 38 produces at output 44 a specific envelope waveform which is applied it to a second input of AND gate 30. The alert envelope waveforms corresponding to function detect signals F1–F4 are shown in FIGS. 4A–4D respectively. Obviously, different function detect waveforms may be employed.

Figure 5A:
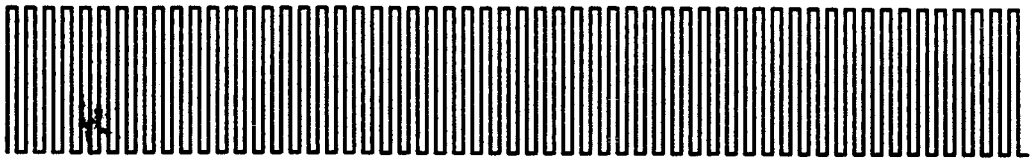
FIGS. 5A–C are waveforms illustrating how an alert activation signal can be modulated by the output of the alert envelope waveform generator of FIG. 2.
Figure 5B:
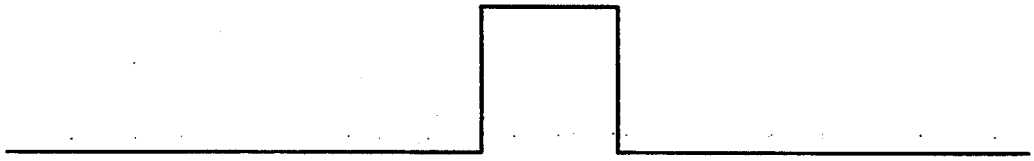
Figure 5C:
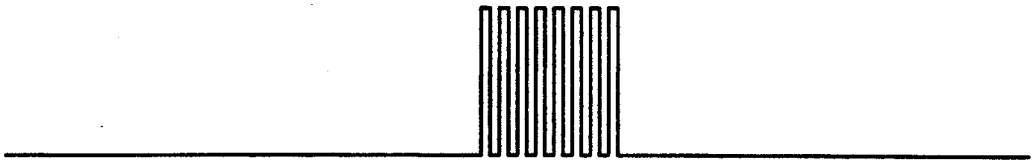

A silent mode enable signal is applied to the input of an inverter 46 which has an output coupled to a third input of AND gate 30. As long as the silent enable signal is low indicating that a silent mode of operation is not desired, the output of inverter 46 will be high thus enabling AND gate 30. That is, the audio alert signal 28 appearing at the first input of AND gate 30 is modulated by the alert envelope waveform 44 appearing at the second input of AND gate 30. Thus, if, for example, the audio alert signal appeared as is shown in FIG. 5A and the alert envelope waveform appeared as is shown in FIG. 5B, the signal appearing at the output of AND gate 30 would be as is shown in FIG. 5C. The signal appearing at the output of AND gate 30 is applied to amplifier 32 which acts as the source of an energizing signal. The amplifier 32 then drives the transducer 34 to provide an audible alert.

The alert envelope waveform output 44 is also applied to the input of inverter 48 which in turn has an output coupled to the input of amplifier 50. Amplifier 50 produces an energizing signal at its output which activates lamp 52 for generating a visual alert output. Thus, it should be clear that the audible alert output is generated in accordance with a predetermined pattern; i.e. the alert envelope waveform, while the visual alert output is generated in accordance with a pattern which is the complement of the alert envelope waveform. In this manner, the audible and visual alerts are not activated simultaneously, thus reducing peak loading on the battery.

If desired, a tactile or vibratory alert output may be generated as follows. The output of inverter 48 is applied to the input of inverter 54 which in turn has an output coupled to a first input of AND gate 56. The silent mode enable signal is applied to the second input of AND gate 56. The output of AND gate 56 is coupled to an input of amplifier 58 which in turn is coupled to motor 60. Motor 60, when activated by the energizing signal from amplifier 58, will generate a vibratory alert output. That is, if the silent mode enable signal is high, the output of inverter 46 is low thus disabling AND gate 30. In this case, there will be no audible alert generated by speaker 34. However, a visual alert output may still be generated. Since the silent mode enable signal is high, the output of inverter 54 (i.e. the alert envelope waveform) is gated through AND gate 56 to amplifier 58 thus activating motor 60. Thus, a tactile alert output will be generated during a period of time which is complementary to the time that the visual alert output is generated.

Figure 3:
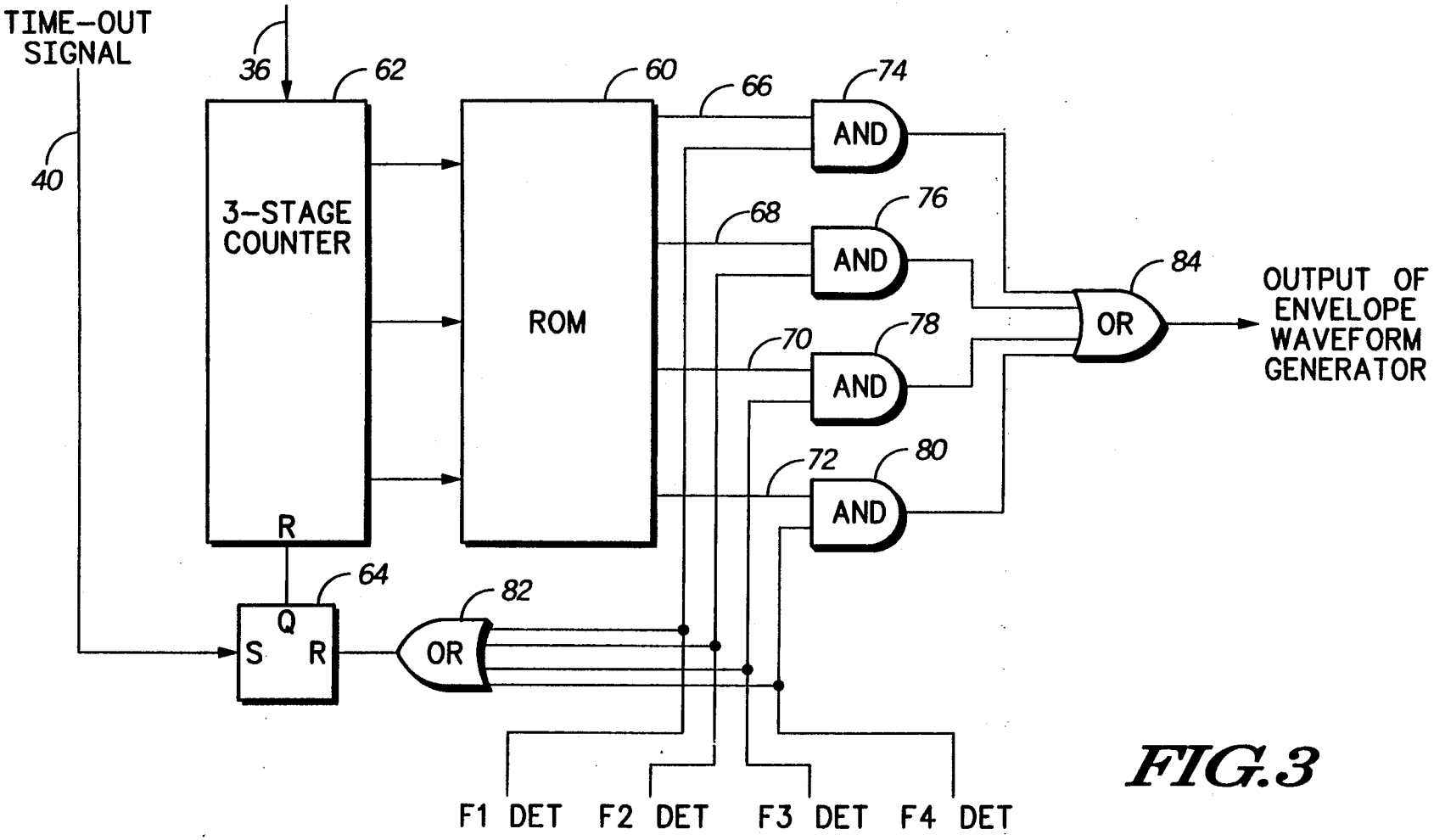
FIG. 3 is a logic diagram illustrating the alert envelope waveform generator shown in FIG. 2.

FIG. 3 illustrates the alert envelope waveform generator 38 in more detail. ROM 60 receives as inputs the outputs of a three-stage counter 62. Counter 62, when not in a reset condition, counts pulses 36 which are generated by divider 26 in FIG. 2. The time-out signal 40 also generated by divider 26 is applied to the set inputs of a flip-flop 64 having a Q output which is applied to the reset input of counter 62.

ROM 60 is provided with four outputs 66, 68, 70, and 72 at which the envelope waveforms corresponding to functions F1–F4 as is shown in FIGS. 4A–D are produced. ROM outputs 66, 68, 70, and 72 are applied each to a first input of AND gates 74, 76, 78, and 80 respectively. The second inputs of AND gates 74, 76, 78, and 80 are coupled to a corresponding function detect signal F1 DET, F2 DET, F3 DET, and F4 DET respectively. The function detect signals are also applied to first, second, third, and fourth inputs of OR gate 82 which has an output coupled to the reset input (R) of flip-flop 64. The outputs of AND gates 74, 76, 78, and 80 are applied to first, second, third, and fourth inputs respectively of OR gate 84, the output of which corresponds to the desired envelope waveform.

When a function detect signal is decoded in address decoder 42 (FIG. 2), the output of OR gate 82 goes high causing flip-flop 64 to be reset. This permits three-stage counter to cycle by counting pulses 36 which are generated by divider 26 (FIG. 2). In response to the outputs of counter 62, ROM 60 generates the envelope waveforms shown in FIGS. 4A–D at outputs 66, 68, 70 and 72 respectively. However, only one of the waveforms (the one corresponding to the decoded function detect signal) will be gated through to OR gate 84 and subsequently to AND gate 30 in FIG. 2.

Each of the envelopes 66, 68, 70, and 72 shown in FIGS. 4A–D correspond to a specific pattern which may be, for example, one second in duration. The time-out period may be, for example, ten seconds in length thus permitting the envelope pattern to repeat itself ten times. During the time-out period, the function detect signals are stored in address decoder 42. At the end of the time-out period, time-out signal 40 resets that portion of address decoder 42 which stores the function detect signals F1–F4. In addition, time-out signal 40 sets flip-flop 64 in FIG. 3 which in turn resets three-stage counter 62.

Figure 6A:
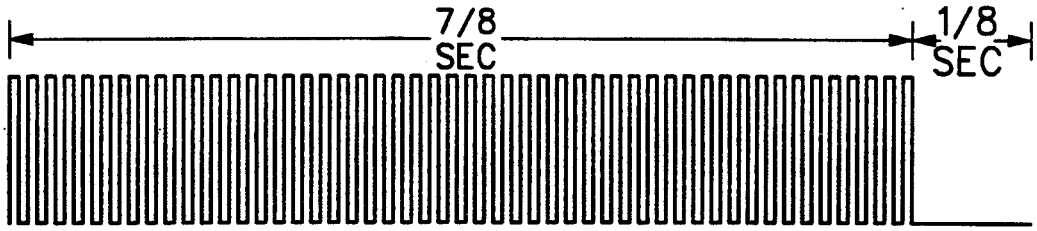
FIGS. 6A–H illustrate a plurality of complementary alert signals generated in accordance with the teachings of the present invention.
Figure 6B:
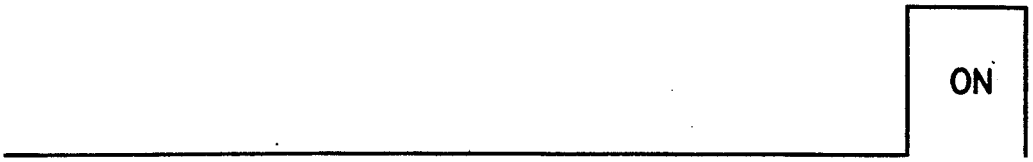

FIGS. 6A and 6B are waveforms illustrating the audible and visual alert signals which are generated in response to a F1 DET decode. As can be seen, the audible signal continues for approximately $\frac{7}{8}$ of a second. When the audible signal terminates, the visual signal is generated for $\frac{1}{8}$ of a second. This is repeated until the time-out signal resets address counter 42 and counter 62. If the time-out period is ten seconds, the audible and visual alert patterns will repeat ten times. The alert outputs could also be terminated by the activation of a reset switch in a manner that is well known in the art.

Figure 6C:
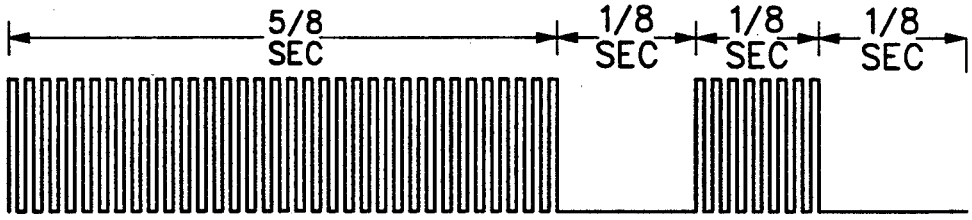
Figure 6D:
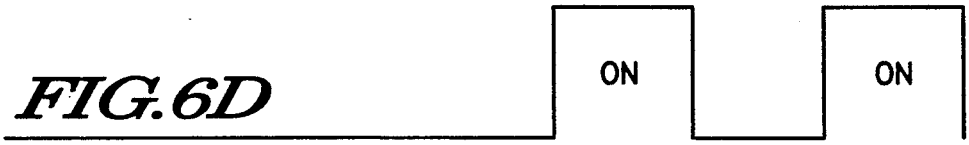
Figure 6E:
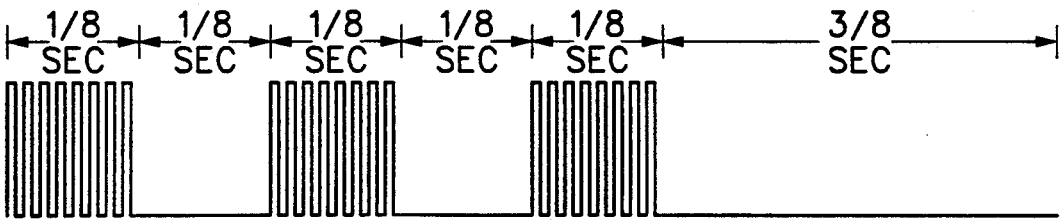
Figure 6F:
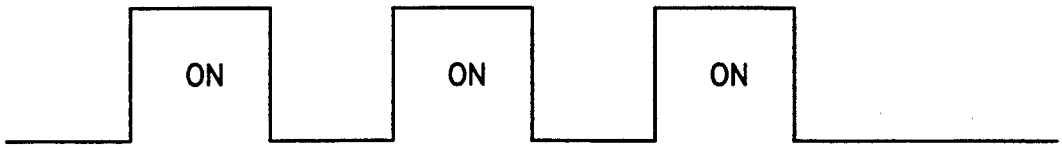
Figure 6G:
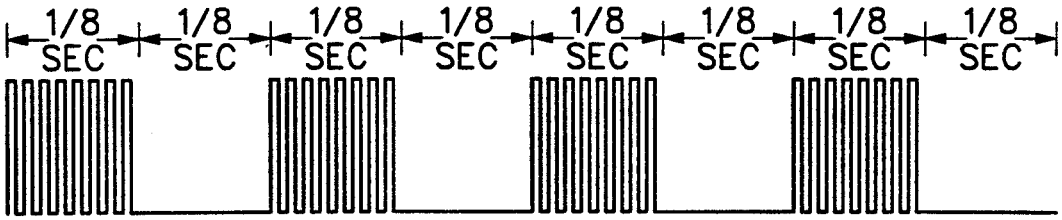
Figure 6H:
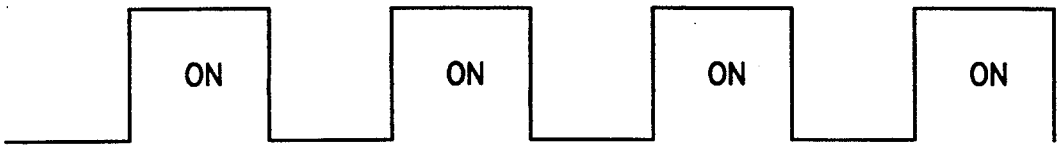

FIGS. 6C and 6D illustrate the complementary alert patterns corresponding to F2 DET, FIGS. 6E and 6F illustrate the complementary audible and visual alert patterns corresponding to F3 DET, and FIGS. 6G and 6H illustrate the complementary audible and visual alert patterns corresponding to F4 DET. The complementary alert patterns shown have the desirable feature that both the audible and visual alert envelopes convey readily discernible information about which address function has been received. That is, the function 1 alerts consist of one tone burst alternating with one flash of the lamp, the function 2 alerts consist of two tone bursts alternating with two lamp flashes, etc.

The above description is given by way of example only. Changes in form and details may be made by one skilled in the art without departing from the scope of the invention as defined by the appended claims. For example, while the alert patterns have been described as being complementary, it is only necessary that they do not occur simultaneously. Thus, in any interval of time, a first alert may be generated and, after its conclusion, a second alert generated. This sequence is repeated as desired until time-out has occurred.

What is claimed is:

1. An alert generating apparatus for use in conjunction with a selective call receiver having an address decoder that matches a received address recovered from an input signal to an address assigned to the selective call receiver and generates at least one function detect signal corresponding to an alert sequence, said apparatus comprising:

first means for generating a first alert signal selected in response to the function detect signal received from the address decoder;

second means for generating a second alert signal selected in response to the function detect signal received from the address decoder; and means for alternatingly presenting at least a selected two of an audible alert signal, a visual alert signal, and a tactile alert signal as determined at least in part by the received address and controlled by the first and second alert signals, thereby producing the alert sequence and reducing the load on the energy source.

2. An apparatus according to claim 1 wherein said first means comprises:

envelope generating means for producing a modulating signal;

a source of an energizing signal; and third means for modulating said energizing signal with said modulating signal to produce said first alert signal.

3. An apparatus according to claim 2 wherein said second means comprises first inverting means having an input coupled to said envelope generating means and responsive to said modulating signal.

4. An apparatus according to claim 2 wherein said modulating means is an AND gate.

5. An apparatus according to claim 2 wherein said envelope generating means is capable of generating a plurality of different modulating signals each having a different predetermined pattern.

6. An apparatus according to claim 1 wherein said first means comprises envelope generating means for producing a signal.

7. An apparatus according to claim 6 wherein said second means comprises inverting means having an input coupled to said envelope generating means and responsive to said signal.

8. An alert generating apparatus for use in conjunction with a selective call receiver having an address decoder that matches a received address recovered from an input signal to an address assigned to the selective call receiver and generates at least one function detect signal corresponding to an alert sequence, said apparatus comprising:

first means for generating a first alert signal selected in response to the function detect signal received from the address decoder;

second means for generating a second alert signal selected in response to the function detect signal received from the address decoder; and means for alternatingly presenting at least a selected two of an audible alert signal, a visual alert signal, and a tactile alert signal as determined at least in part by the received address and controlled by the first and second alert signals, a first of the at least a selected two alert signals being activated during at least a first portion of each of a plurality of successive time intervals and a second of the at least a selected two alert signals being activated during at least a second portion of each of a plurality of successive time intervals, the second portion being subsequent to the first portion, thereby producing the alert sequence and reducing the load on the energy source.

9. An apparatus according to claim 8 wherein said first and second alert signals are complementary.

10. An apparatus according to claim 8 wherein said first means comprises:

envelope generating means for producing a modulating signal having a first predetermined pattern;

a source of an energizing signal; and third means for modulating said energizing signal with said modulating signal to produce said first alert signal.

11. An apparatus according to claim 10 wherein said second means comprises inverting means having an input coupled to said envelope generating means and responsive to said modulating signal.

12. An apparatus according to claim 10 wherein said modulating means is an AND gate.

13. An apparatus according to claim 10 wherein said envelope generating means is capable of generating a plurality of different modulating signals each having a different predetermined pattern.

14. In a selective call receiver having an alert generating apparatus, the selective call receiver having an address decoder that matches a received address recovered from an input signal to an address assigned to the selective call receiver and generates at least one function detect signal correswponding to an alert sequence, a method comprising the steps of:

generating a first alert signal selected in response to the function detect signal received from the address decoder;

generating a second alert signal selected in response to the function detect signal received from the address decoder; and alternatingly presenting at least a selected two of an audible alert signal, a signal alert signal, and a tactile alert signal, as determined at least in part by the recieved address and controlled by the first and second alert signals, a first of the at least a selected two alert signals being activated during at least a first portion of each of a plurality of successive time intervals and a second of the at least a selected two alert signals being activated during at least a second portion of each of a plurality of successive time intervals, the second portion being subsequent to the first portion, thereby producing the alert sequence and reducing the load on the energy source.

* * * * *